(12) United States Patent
Wang et al.

(10) Patent No.: US 8,719,644 B2
(45) Date of Patent: May 6, 2014

(54) METHOD AND SYSTEM FOR DIAGNOSING APPARATUS

(75) Inventors: Feizhou Wang, Shenzhen (CN); Lin Tao, Shenzhen (CN); Yi Li, Shanghai (CN); Lin Chang, Shenzhen (CN)

(73) Assignee: Huawei Technologies Co., Ltd. (CN)

( * ) Notice: Subject to any disclaimer, the term of this patent is extended or adjusted under 35 U.S.C. 154(b) by 158 days.

(21) Appl. No.: 13/338,842

(22) Filed: Dec. 28, 2011

(65) Prior Publication Data

US 2012/0096319 A1 Apr. 19, 2012

Related U.S. Application Data

(63) Continuation of application No. PCT/CN2010/079142, filed on Nov. 25, 2010.

(30) Foreign Application Priority Data

Nov. 30, 2009 (CN) .......................... 2009 1 0188485

(51) Int. Cl.
*G06F 11/00* (2006.01)

(52) U.S. Cl.
USPC .......................................... 714/46; 714/47.1

(58) Field of Classification Search
USPC ............................ 714/45, 46, 47.1
See application file for complete search history.

(56) References Cited

U.S. PATENT DOCUMENTS

| | | | |
|---|---|---|---|
| 2003/0154428 A1* | 8/2003 | Pelner | 714/36 |
| 2005/0033952 A1* | 2/2005 | Britson | 713/2 |
| 2005/0278147 A1 | 12/2005 | Morton et al. | |
| 2007/0094538 A1 | 4/2007 | Kung et al. | |
| 2008/0010486 A1 | 1/2008 | Perng et al. | |

FOREIGN PATENT DOCUMENTS

| | | |
|---|---|---|
| CN | 1648870 A | 8/2005 |
| CN | 1700182 A | 11/2005 |
| CN | 1704763 A | 12/2005 |
| CN | 1952909 A | 4/2007 |
| CN | 101276303 A | 10/2008 |

OTHER PUBLICATIONS

Written Opinion of the International Searching Authority issued in corresponding PCT Patent Application No. PCT/CN2010/079142, mailed Mar. 10, 2011.

Search Report issued in corresponding Chinese Patent Application No. 200910188485.0, mailed Jul. 24, 2012.

(Continued)

*Primary Examiner* — Dieu-Minh Le
(74) *Attorney, Agent, or Firm* — Huawei Technologies Co., Ltd.

(57) ABSTRACT

A method and a system for diagnosing an apparatus are provided. The method for diagnosing the apparatus includes: determining whether the apparatus is to enter a diagnostic mode after a system is started; performing a diagnosis of the apparatus by executing a diagnostic proge apparatus is determined to enter the diagnostic mode; and performing a normal BIOS or EFI startup when the apparatus is determined not to enter the diagnostic mode. An accurate diagnosis of the apparatus can be realized by firstly determining whether the apparatus is to enter a diagnostic mode after a system is started, if yes, then the apparatus entering the diagnostic mode, and if not, then the apparatus performing a normal BIOS or EFI startup. Moreover, in case of a memory or PCI/PCIE bus error in the apparatus, since the diagnostic program is loaded prior to the BIOS startup, the fault can be diagnosed.

8 Claims, 5 Drawing Sheets

(56) References Cited

OTHER PUBLICATIONS

International Search Report issued in corresponding PCT Patent Application No. PCT/CN2010/079142, mailed Mar. 10, 2011.
Office Action issued in corresponding Chinese Patent Application No. 200910188485.0; mailed Jul. 4, 2012.

Extended European Search Report issued in corresponding European Patent Application No. 10832663.8, mailed Jun. 13, 2012.
Office Action issued in corresponding Russian Patent Application No. 2012113830, dated May 14, 2013, 5 pages.
Office action issued in corresponding Russian application No. 2012113830, dated May 14, 2013, and an English translation thereof, total 5 pages.

* cited by examiner

METHOD AND SYSTEM FOR DIAGNOSING APPARATUS

CROSS-REFERENCE TO RELATED APPLICATIONS

This application is a continuation of International Application No. PCT/CN2010/079142, filed Nov. 25, 2010, which claims priority to Chinese Patent Application No. 200910188485.0, filed Nov. 30, 2009, both of which are hereby incorporated by reference in their entireties.

FIELD

The present disclosure relates to the field of communication technology, and in particular, to an apparatus diagnosing method and system.

BACKGROUND

In IT and electronic communication fields, in order to improve the reliability of the operation of an apparatus and enhance the maintainability of the apparatus, a diagnostic detection will generally be performed on the apparatus. If there is an error, relevant error information will be output, and a maintenance operation will be subsequently performed on the apparatus based on the error information.

An apparatus based on X86 architecture firstly performs initialization and diagnosis of hardware devices via a BIOS (Basic Input Output System) or EFI (Extensible Firmware Interface) startup system, and then enters the operating system. Taking the BIOS startup as an example, in order to perform a diagnosis on the hardware devices, a method is often used in the prior art wherein a debug program is added into the BIOS, and debug information is output to the 0x80 port by running the debug program. The diagnostic information is generally simple and gives a small amount of information, and it is impossible to make a more accurate judgment on the fault.

Figure 1:
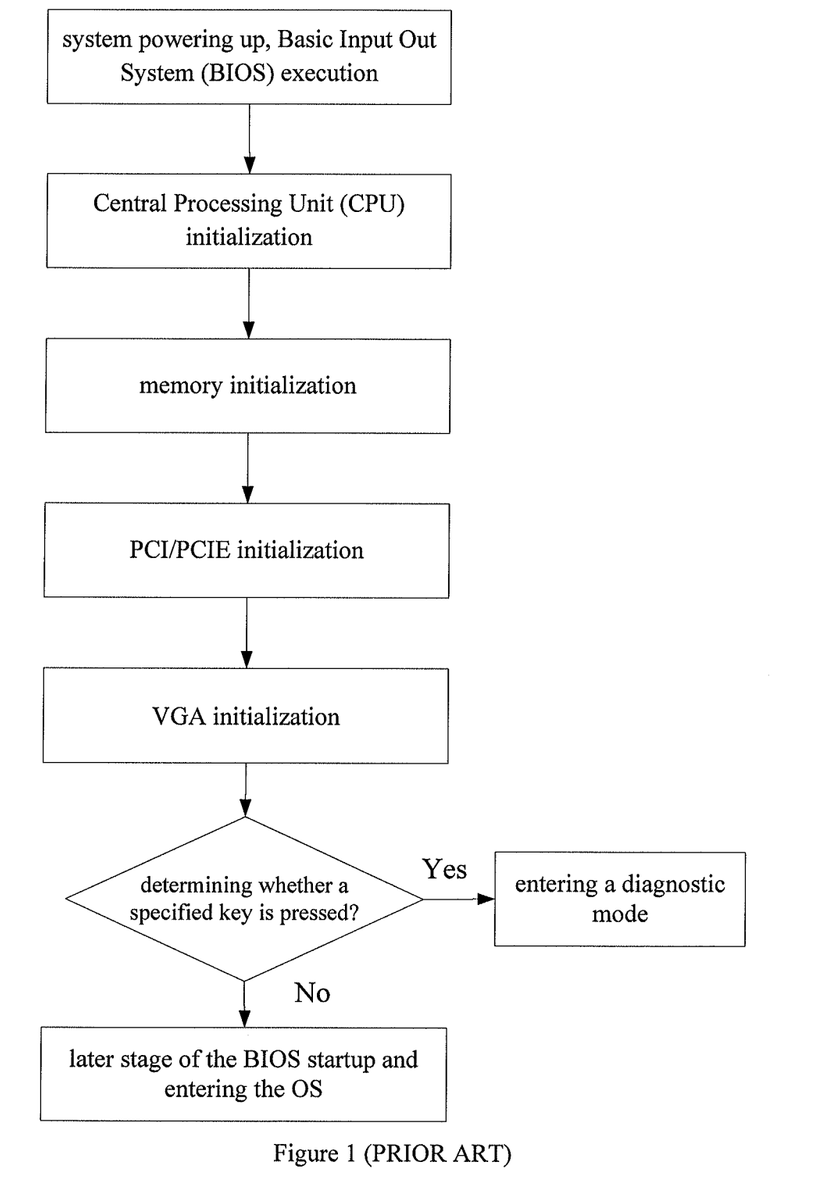
FIG. 1 is a flow chart illustrating an apparatus diagnosing method in the prior art.

To obtain more accurate diagnostic information, in the prior art, a special diagnostic program is operated in the operating system or is triggered through a specified key in the BIOS startup stage to perform a diagnostic detection. See FIG. 1, after the system is powered up, the BIOS program is executed. Firstly, a processor such as a central processing unit (CPU) is initialized, and then devices like memory, PCI/PCIE and VGA are initialized. Next, it is judged whether there is a specified key being pressed, and if yes, a diagnostic mode is entered to perform a diagnosis, including diagnosis of keyboard, memory, PCI devices, hard disk, etc. If there is no specified key being pressed, the BIOS startup is continued and OS is entered. Since devices such as the memory and VGA have been initialized before the diagnostic mode is entered, information is displayed in detail through a display after the diagnosis is completed. In this way, the user can locate the fault of the apparatus more accurately, making the maintenance more convenient.

The inventors, when making the present disclosure, found that the prior art at least has the following disadvantages.

When using 0x80 port debug, the output information is generally too simple and it is impossible to make an accurate judgment on the fault. Meanwhile, when using the special diagnostic program, since it is operated in the operating system or is operated in the BIOS startup stage, when a fault occurs in the memory or PCI/PCIE (Peripheral Component Interconnect/Peripheral Component Interconnect Express), devices such as the display and the keyboard generally cannot be used, the diagnostic functions cannot be realized.

SUMMARY

The embodiments of the present disclosure provide an apparatus diagnosing method and system, which can perform an accurate diagnosis of the apparatus, and can realize the diagnostic functions even in case of a fault in devices such as a memory or PCI/PCIE.

A method is provided for diagnosing an apparatus. The method includes: determining whether to enter a diagnostic mode after a system is started; performing a diagnosis of the apparatus by executing a diagnostic program when it is determined to enter the diagnostic mode; and performing a normal BIOS or EFI startup when it is determined not to enter the diagnostic mode.

An apparatus diagnosing system is provided. The system includes: a determining unit configured to determine whether to enter a diagnostic mode after a system is started; a diagnosing unit configured to perform a diagnosis of the apparatus by executing a diagnostic program when the determining unit determines to enter the diagnostic mode; and a normal startup unit configured to perform a normal BIOS or EFI startup when the determining unit determines not to enter the diagnostic mode.

The above solutions have the following advantages.

The embodiments of the present disclosure realize an accurate diagnosis of the apparatus by firstly determining whether to enter a diagnostic mode after a system is started, if yes, then entering the diagnostic mode, and if not, then continuing to perform a BIOS or EFI startup. Moreover, in case of a memory or PCI/PCIE bus error in the apparatus, since the diagnostic program is loaded prior to the BIOS startup, the fault can be diagnosed.

BRIEF DESCRIPTION OF THE DRAWINGS

To explain the solutions in the embodiments of the present disclosure more clearly, the drawings needed for the descriptions of the embodiments or prior art will be introduced briefly. Obviously, the drawings in the following descriptions are merely some embodiments of the present disclosure. For those skilled in the art, other drawings can be obtained according to these drawings without paying creative efforts.

DETAILED DESCRIPTION OF THE EMBODIMENTS

To make the objects, solutions and advantages of the present disclosure clearer, the present disclosure will be further explained in detail through embodiments and the corresponding drawings as follows.

Embodiment 1

Figure 2:
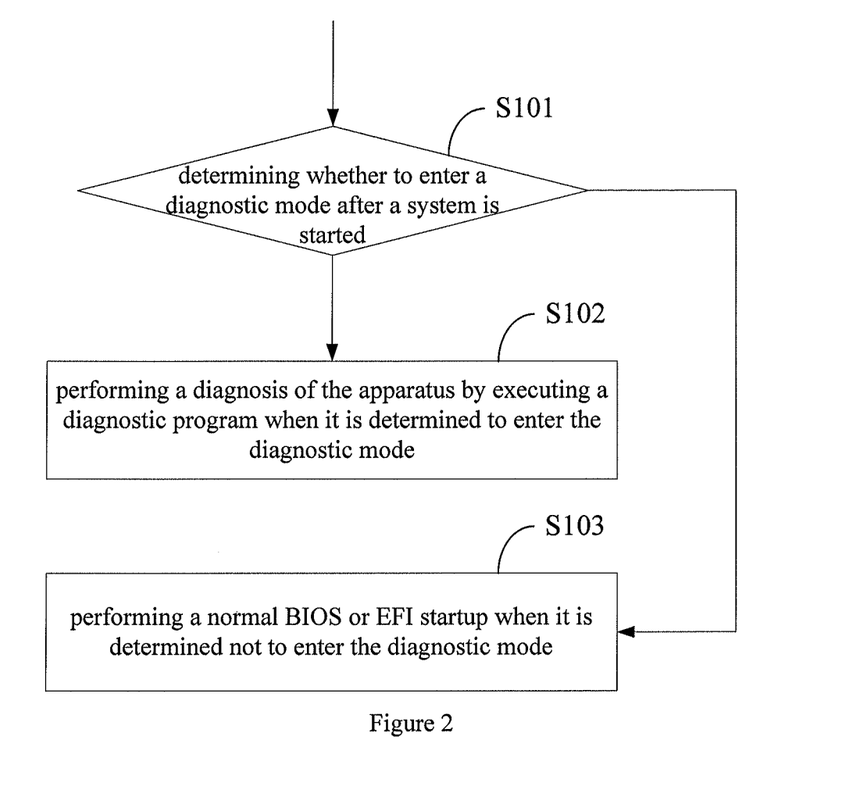
FIG. 2 is a flow chart illustrating a method of Embodiment 1 of the present disclosure.

Embodiment 1 of the present disclosure provides an apparatus diagnosing method. See FIG. 2, the method comprises the following steps:

S101: determining whether to enter a diagnostic mode after a system is started;

S102: performing a diagnosis of the apparatus by executing a diagnostic program when it is determined to enter the diagnostic mode; and S103: performing a normal BIOS or EFI startup when it is determined not to enter the diagnostic mode.

In the embodiment of the present disclosure, the diagnostic program code may be placed in the same memory as the original normal BIOS or EFI of the system, for example, in a memory like flash and E2PROM, etc.; and it may also be placed in a different memory from the BIOS or EFI, for example, an additional memory may be added to the system to store the diagnostic program code. No matter which storing method is used, the diagnostic program code and the BIOS program code (or EFI program code) are independent of each other.

It is noted that the above-mentioned normal BIOS (or EFI) mainly indicates a BIOS (or EFI) having the original system BIOS function. In practical applications, a BIOS generally indicates a program segment initiated prior to the operation system (OS). The code for the original BIOS function, the newly added diagnostic program code and the determination program code are all prior to the initiation of the operation system. Therefore, the original BIOS function code, the diagnostic program code and the determination program code can also be regarded as a new BIOS. For the convenience of description, the embodiment of the present disclosure describes the original BIOS part and the new diagnostic module as two parts.

The method for determining whether to enter the diagnostic mode may be performed by means of external level triggering, and may also be performed through software setting. After entering the diagnostic mode, in order to accelerate the program execution, a program code in the memory can be loaded into a cache for execution.

Before entering the diagnostic program to diagnose the apparatus, some initializations of the system are performed firstly, such as initializations of a cache, a serial port, etc. The diagnosis mainly comprises diagnosis of some hardware devices such as the memory and PCI/PCIE. The specific contents for diagnosis may be determined according to actual applications. The relevant diagnostic information may be output through the serial port after the completion of the diagnosis. Since the contents for diagnosis can be self-defined, the diagnostic functions can be more abundant and accurate.

The embodiment of the present disclosure realizes an accurate diagnosis of the apparatus by firstly determining whether to enter a diagnostic mode after a system is started, if yes, then entering the diagnostic mode, and if not, then continuing to perform a normal BIOS or EFI startup. Moreover, in case of a memory or PCI/PCIE bus error in the apparatus, since the diagnostic program is loaded prior to the BIOS startup, the fault can be diagnosed.

Embodiment 2

The embodiment of present disclosure provides an apparatus diagnosing method, taking the apparatus using BIOS startup as an example. See FIG. 3, the method comprises the following steps.

Figure 3:
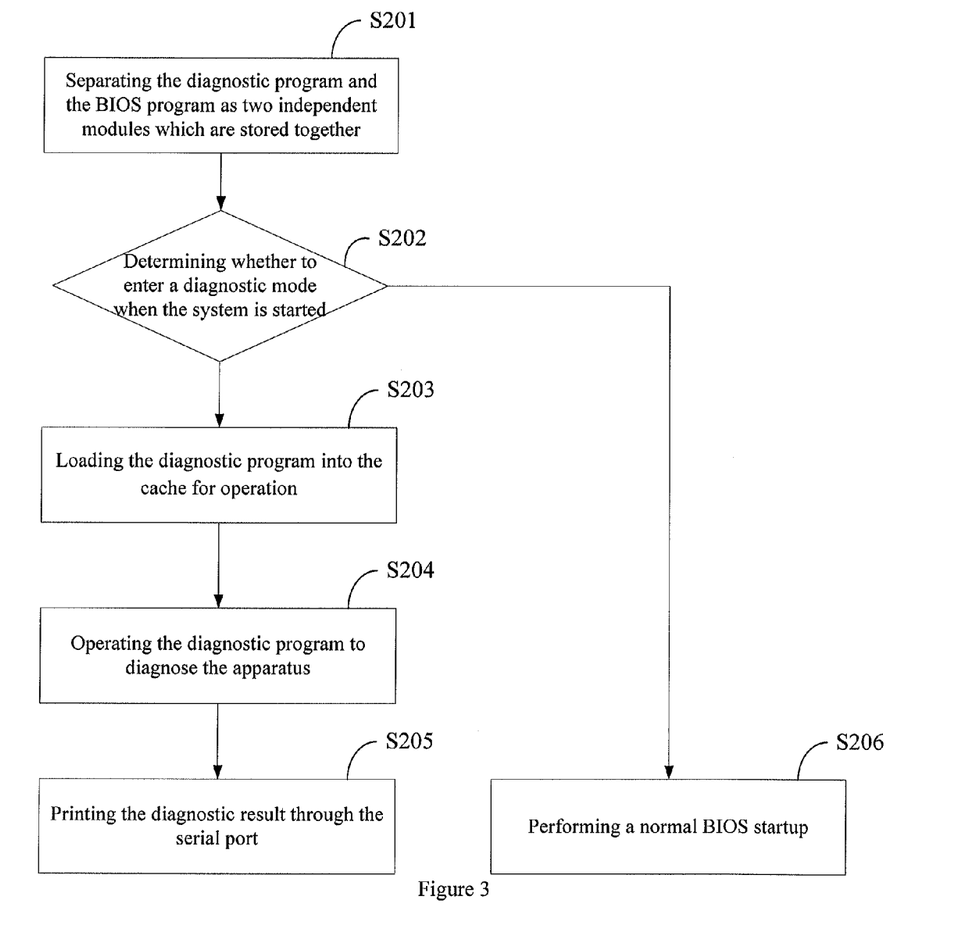
FIG. 3 is a flow chart illustrating a method of Embodiment 2 of the present disclosure.

S201: Separating the diagnostic program and the BIOS program as two independent modules which are stored together.

The BIOS program here is consistent with the existing normal BIOS program, which performs apparatus starting function and is generally stored in a memory like flash, E2PROM, etc. The diagnostic program is independent of the existing BIOS program, i.e., individually executing one of the diagnostic program and the BIOS program will not influence the other program. The diagnostic program may be implemented using C language or other languages, and after compilation, a binary computer-executable program is generated, which then may be stored together with the BIOS in the same memory, and may also be stored in a different memory from the BIOS. The memories here may use flash, E2PROM, etc.

In order to select which program module to operate when the system is started, there is also a startup bootstrap in the memory for selecting which program module to operate when the system is just started. For the convenience of use, the startup bootstrap program, the BIOS program and the diagnostic program may be placed into the same memory.

It is noted that the above-mentioned BIOS mainly indicates a BIOS having the original system BIOS function. In practical applications, a BIOS generally indicates a program segment initiated prior to the operation system (OS). The code for the original BIOS function, the newly added diagnostic program code and the determination program code are all prior to the initiation of the operation system. Therefore, the original BIOS function code, the diagnostic program code and the determination program code can also be regarded as a new BIOS. When executing this new BIOS, it is firstly determined whether to proceed to the diagnostic program, if yes, operate the diagnostic program code, and if not, perform the normal BIOS startup like device initialization. For the convenience of description, the embodiment of the present disclosure describes the original BIOS part and the new diagnostic module as two parts.

S202: Determining whether to enter a diagnostic mode when the system is started, if yes, performing step S203, and if not, performing step S206.

Methods for determining whether to enter the diagnostic mode include but are not limited to the following ones.

Through External Level Triggering

For example, if a user wants to enter the diagnostic mode, a GPIO (General Purpose Input/Output) pin level may be triggered. The level value will be reflected to a value of a certain register in the apparatus (e.g., a GPIO register). The startup bootstrap of the system may determine whether to enter the diagnostic module or to perform normal BIOS startup by checking the register status of the apparatus. It may be set to use the BIOS to perform the normal startup flow by default, and upon detection of a command of the user (triggering the GPIO pin level), the diagnostic mode is entered.

2) Through Software Setting

Besides by means of external level triggering, software setting can also be used for triggering. For example, the user may set in the BIOS whether to enter the diagnostic mode at the next startup (e.g., an option may be provided in the BIOS configuration interface for determining whether to enter the diagnostic mode). The configuration will be saved in a CMOS (Complementary Metal Oxide Semiconductor). At the next startup, a value in the CMOS will be read firstly. If the value is an effective value (e.g., 1), the diagnostic mode will be entered; otherwise, a normal BIOS startup will be performed. After reading the value in the CMOS, the effective value will be cleared to prevent from entering the diagnostic mode automatically at the next time.

S203: Loading the diagnostic program into the cache for operation.

The cache is normally integrated in the CPU. The operation speed of the program in the cache is far greater than an operation speed in an external memory. Thus, the diagnostic program may be loaded into the cache to improve the operating efficiency. Likewise, the startup bootstrap may also be loaded into the cache for operation. However, since the startup bootstrap operates in a very short period of time, it will not have significant influence on the performance no matter where it operates. The time for executing the diagnostic program is much longer than the startup bootstrap. Thus, loading the startup bootstrap into the cache can improve the operating efficiency of the program significantly.

The diagnostic program may be loaded into the cache in the following manner.

Firstly, an address in the memory is mapped to an address in the cache. Secondly, the CPU directly accesses the flash address, and then the CPU looks up in the cache whether there is a backup of the code segment at the flash address just accessed, if not, the code segment at the flash address accessed is loaded to the cache.

In order to load the program into the cache for operation, it is necessary to configure the cache as a normal memory. Generally, the cache may be configured as a normal memory by setting a relevant register of the CPU, wherein a part of the cache is used to store a program code, i.e., storing the program code that is loaded therein from an external memory during the operation of the program, and another part of the cache is configured as a stack area in the software, such that an advanced language (e.g., the C language) may be conveniently used to program (advanced languages generally need a stack).

By loading the diagnostic program into the cache for operation, the CPU can fetch instructions from the cache instead of fetching instructions from an external memory each time. The speed of fetching instructions from the cache is far greater than the speed of fetching instructions from the external memory. Therefore, the access time is greatly reduced, such that the program operates in the cache at a much higher speed than in the external memory, which improves the executing efficiency.

It is noted that this step is not necessary. If some CPUs do not support configuring the cache as a normal memory or do not have strict requirements on the operation speed, instructions may also be fetched from the external memory for operation each time. Meanwhile, if it is unnecessary to use the stack function (e.g., the advanced language is not used), it is also unnecessary to configure a part of the cache as a stack in the software.

Moreover, the size of the loaded program cannot exceed a maximum value of the cache configuration. If the maximum value is exceeded, only the maximum value of the cache configuration can be loaded, and the rest operates in the external memory.

S204: Operating the diagnostic program to diagnose the apparatus.

Figure 4:
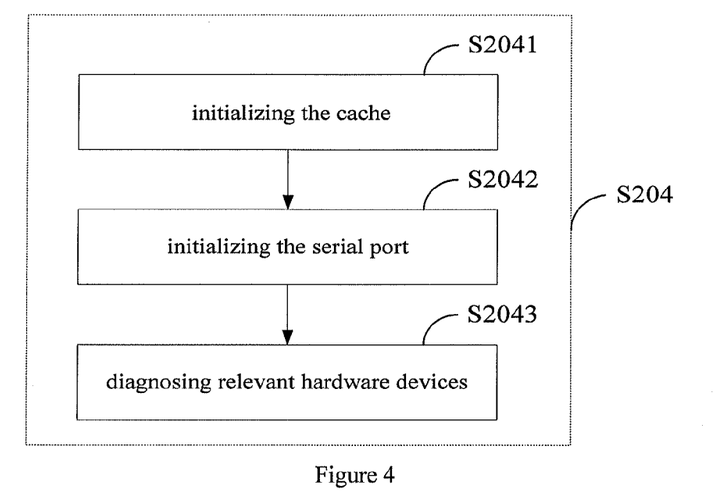
FIG. 4 is a flow chart illustrating step S204 in Embodiment 2 of the present disclosure.

See FIG. 4, operating the diagnostic program comprises the following steps.

S2041: Initializing the cache;
comprising steps of enabling the cache, mapping a code address of the diagnostic module in the external memory into the cache, setting a part as a code segment (for storing the diagnostic module code loaded therein during operation) and a stack segment.

S2042: Initializing the serial port;
comprising enabling the serial port, and setting a serial port number, transmission speed, number of data bits, number of check bits, etc.

S2043: Diagnosing relevant hardware devices;

The diagnosis is mainly performed on hardware devices such as the memory and the PCI/PCIE. The diagnosis of the memory can be performed by reading SPD (Serial Presence Detect) to judge which DIMM (Dual Inline Memory Module) grooves have a memory bar thereon, and judging which DIMM groove has a problematic data bus or address bus by a DQS (Bidirectional data strobe) check. With respect to hardware-supported devices, it can also be diagnosed which chip grain on the memory bar is faulty by means of data read/write (write one data therein, and then read it to determine whether they are consistent with each other).

Regarding the diagnosis of PCI/PCIE, it may check the vendor ID and device ID to examine whether there are excess devices, and may check the control register, IO, memory register, etc. The diagnostic program will create a table including all the PCI/PCIE device information on the apparatus at the beginning. The information comprises device name, PCI bus number, device ID, function ID, and chip silk screen. If an error is found through the check, it can be checked which chip is faulty based on this information table, to specifically obtain information such as the name of the chip and silk screen.

The hardware devices diagnosed by the diagnostic program are not limited to the above-mentioned memory and PCI/PCIE. The user may self-define the hardware devices to be diagnosed according to the actual needs.

S205: Printing the diagnostic result through the serial port.

Since the hardware like the display cannot yet work normally at this time, the fault information obtained by diagnosis can be printed through the serial port. Other information output methods, if available, can also be used to output information.

S206: Performing a normal BIOS startup;

This step is similar to the normal BIOS startup in the prior art, comprising memory initialization, PCI/PCIE initialization, and VGA initialization. After starting the BIOS, the operating system OS is entered. The above specific operating procedures are similar to those in the prior art, the description of which is omitted here.

It is noted that after step S205, the program can be paused to wait for an operation by the user. It can also be determined whether or not to enter the BIOS according to the diagnostic result, for example, the BIOS is not entered if a problem is found, and a normal BIOS startup will be performed if there is no problem.

In another embodiment of the present disclosure, if the apparatus is started using an EFI architecture, the diagnostic program and the EFI module can also be separated by referring to the above step S201, and then it is determined whether to enter the diagnostic mode. If yes, a diagnosis will be performed on the apparatus, and if not, a normal EFI startup will be performed.

The embodiment of the present disclosure realizes an accurate diagnosis of the apparatus by firstly determining whether to enter a diagnostic mode after a system is started, if yes, then entering the diagnostic mode, and if not, then continuing to perform a normal BIOS or EFI startup. Meanwhile, by performing the diagnostic program and the BIOS startup separately, the diagnosis can also be performed even if there is a problem with the memory or PCI/PCIE.

The embodiment of the present disclosure also configures the cache of the CPU as a normal memory, and firstly loads the diagnostic program from the memory to the cache when operating the diagnostic program, and then operates the program in the cache, so as to accelerate the operation, which improves the diagnostic efficiency.

Embodiment 3

Figure 5:
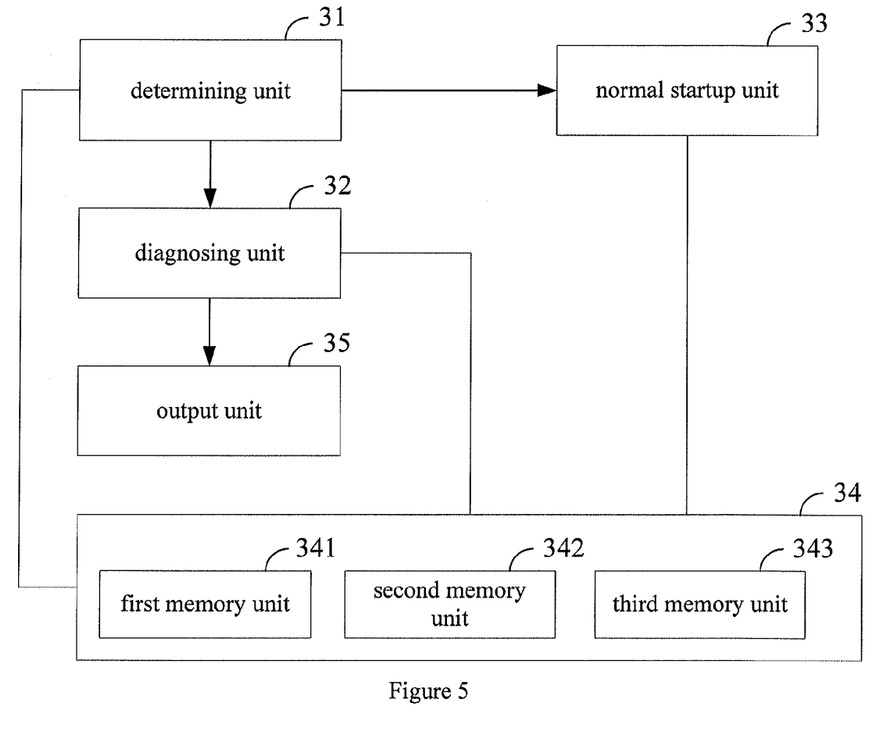
FIG. 5 is a schematic diagram illustrating a system of Embodiment 3 of the present disclosure.

The embodiment of the present disclosure provides an apparatus diagnostic system, comprising:

a determining unit 31 for determining whether to enter a diagnostic mode after a system is started;

a diagnosing unit 32 for performing a diagnosis of the apparatus by executing a diagnostic program when the determining unit determines to enter the diagnostic mode; and a normal startup unit 33 for performing a normal BIOS or EFI startup when the determining unit determines not to enter the diagnostic mode.

The embodiment of the present disclosure may also comprise memory units 34 for storing program codes, the memory units comprising:

a first memory unit 341 for storing a program code executed by the determining unit;

a second memory unit 342 for storing diagnostic program code;

a third memory unit 343 for storing a BIOS or EFI program code.

The memory units may use memories such as flash or E2PROM, wherein the code of the diagnostic program and the code of the BIOS or EFI program are two independent program code segments.

The second memory unit 342 and the third memory unit 343 may use the same memory, or they may also be implemented by using different memories. In order to facilitate use, the first memory unit 341, the second memory unit 342 and the third memory unit 343 can be implemented by the same memory.

The method for determining whether to enter the diagnostic mode by the determining unit 31 may be performed by means of external level triggering, and may also be performed through software setting.

To accelerate the speed for executing the program, the cache of the CPU may be configured as a normal memory and the program code in the second memory unit is loaded into the cache for operation.

The diagnosis of the apparatus by the diagnosing unit 32 mainly comprises diagnosis of some hardware devices such as the memory, PCI/PCIE, etc. The specific contents can be determined according to the practical applications. Since the contents for diagnosis can be self-defined, the diagnostic function may be made more abundant and accurate.

The diagnosing unit 32 may also pause the program after the diagnosis is completed to wait for an operation by the user, or determine whether to enter the BIOS startup according to the diagnostic result.

The embodiment of the present disclosure may also include an output unit 35 for outputting the relevant information after the diagnosis.

The output unit 35 can perform output using a serial port. Other information output methods, if available, can also be used to output information.

The above-mentioned determining unit, diagnosing unit, normal startup unit and output unit can be implemented by a hardware processor or relevant logic, for example, they can be implemented by a CPU or other chips having processing functions, wherein it is possible that each unit may use a separate hardware processor, and it is also possible that a plurality of units use a hardware processor in common.

Figure 6:
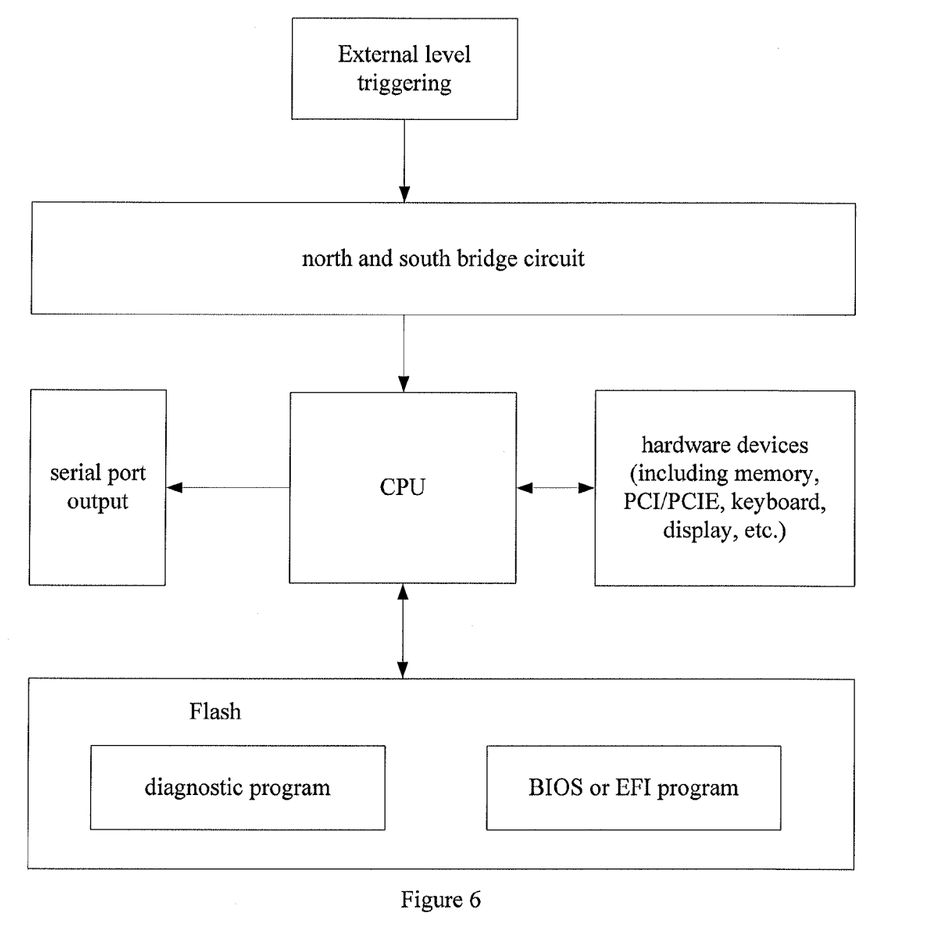
FIG. 6 is a schematic diagram illustrating the specific application scenario of Embodiment 3 of the present disclosure.

FIG. 6 is a block diagram illustrating the specific application of the embodiment of the present disclosure in an x86 system. The above determining unit, diagnosing unit and normal startup unit may all be implemented by a CPU. The memory unit is implemented by a flash, and the output unit is implemented by a serial port.

When the system is started, the CPU firstly determines whether to enter the diagnostic mode, wherein an external level triggering causes a change in the value of relevant register of the south bridge. After detecting the value of the register, it is determined whether to enter the diagnostic mode. If it is determined to enter the diagnostic mode, a diagnosis will be performed on relevant hardware devices which mainly comprise devices such as a memory and PCI/PCIE, and may also comprise other devices such as keyboard and display. After the diagnosis is completed, the relevant information is output through a serial port. If it is determined not to enter the diagnostic mode, a normal BIOS or EFI startup will be performed.

The memory units here are implemented by flash, wherein the code of the diagnostic program and the code of the BIOS or EFI program are two independent codes, but are stored in the same flash. In practical application, two flashes may be used for storage. Moreover, the flash may be replaced with other memories like E2PROM.

The embodiment of the present disclosure realizes an accurate diagnosis of the apparatus by firstly determining whether to enter a diagnostic mode after a system is started, if yes, then entering the diagnostic mode, and if not, then continuing to perform a BIOS or EFI startup. Meanwhile, by performing the diagnostic program and the BIOS startup separately, the diagnosis can also be performed even if there is a problem with the memory or PCI/PCIE.

The embodiment of the present disclosure also configures the cache of the CPU as a normal memory. When operating the diagnostic program, the diagnostic program is firstly loaded from the memory to the cache and then the program is operated in the cache, so that the operation is accelerated, which improves the diagnostic efficiency.

Those skilled in the art will appreciate that some or all procedures in the method of the above embodiments can be performed by a computer program instructing relevant hardware. The program can be stored in a computer-readable storage medium. The program, when executed, may include the procedures of the embodiments of the above-mentioned methods. The storage medium may be a magnetic disk, optical disk, read-only memory (ROM) or random access memory (RAM), etc.

The above preferred embodiments have made further detailed explanations of the object, solution and advantages of the present disclosure. It should be understood that the above embodiments are merely preferred embodiments of the present disclosure, which are not used to limit the present disclosure. Any amendments, equivalent replacements and improvements within the spirit and principle of the present disclosure should fall into the protection scope of the present disclosure.

The invention claimed is:

1. A method for diagnosing an apparatus in a computer system, comprising:
   determining to enter a diagnostic mode after the computer system is started;
   initializing a cache in the computer system;
   after initializing the cache, performing a diagnosis of the apparatus by executing a diagnostic program; and after the diagnosis of the apparatus is completed, executing a Basic Input Output System (BIOS) or Extensible Firmware Interface (EFI) program and loading an operating system, wherein the determining step comprises detecting a trigger of a General Purpose Input/Output (GPIO) pin level.

2. The method according to claim 1, wherein the diagnostic program is independent of the BIOS or EFI program.

3. The method according to claim 1, further comprising:
loading the diagnostic program into the cache for execution.

4. The method according to claim 1, further comprising:
initializing a serial port in the computer system before performing the diagnosis of the apparatus; and
outputting diagnostic results of the apparatus through the serial port.

5. A diagnosing system, comprising:
a determining unit configured to determine to enter a diagnostic mode after a computer system is started;
an initializing unit configured to initialize a cache in the computer system;
a diagnosing unit configured to diagnose an apparatus in the computer system by executing a diagnostic program after the cache is initialized; and
a normal startup unit configured to execute a Basic Input Output System (BIOS) or Extensible Firmware Interface (EFI) program after the diagnosis of the apparatus is completed, and load an operating system, wherein the determining unit is configured to detect a trigger of a General Purpose Input/Output (GPIO) pin level.

6. The diagnosing system according to claim 5, wherein the diagnostic program is independent of the BIOS or EFI program.

7. The diagnosing system according to claim 5, further comprising:
a loading unit configured to load the diagnostic program into the cache for execution.

8. The diagnosing system according to claim 5, wherein the initializing unit is further configured to initialize a serial port in the computer system before the diagnosis of the apparatus is performed, and the system further comprises:
an outputting unit configured to output diagnostic results through the serial port after a completion of the diagnosis.

* * * * *